United States Patent
Yoakum et al.

(10) Patent No.: US 11,310,337 B2
(45) Date of Patent: Apr. 19, 2022

(54) INTERACTIVE CONTACT CENTER MENU TRAVERSAL VIA TEXT STREAM INTERACTION

(71) Applicant: Avaya Inc., Santa Clara, CA (US)

(72) Inventors: John H. Yoakum, Cary, NC (US); Tony McCormack, Barna (IE)

(73) Assignee: Avaya Inc., Santa Clara, CA (US)

( * ) Notice: Subject to any disclaimer, the term of this patent is extended or adjusted under 35 U.S.C. 154(b) by 1341 days.

(21) Appl. No.: 14/585,376

(22) Filed: Dec. 30, 2014

(65) Prior Publication Data
US 2016/0191655 A1     Jun. 30, 2016

(51) Int. Cl.
| | |
|---|---|
| *G06F 3/01* | (2006.01) |
| *G06F 3/0484* | (2013.01) |
| *H04L 67/306* | (2022.01) |
| *G06F 3/04895* | (2022.01) |
| *G06F 9/451* | (2018.01) |

(52) U.S. Cl.
CPC .......... *H04L 67/306* (2013.01); *G06F 3/013* (2013.01); *G06F 3/017* (2013.01); *G06F 3/0484* (2013.01); *G06F 3/04895* (2013.01); *G06F 9/453* (2018.02)

(58) Field of Classification Search
CPC .............. H04M 3/5183; H04M 3/5232; G06F 3/04842; G06F 3/0482; G06F 8/38
See application file for complete search history.

(56) References Cited

U.S. PATENT DOCUMENTS

| | | | | |
|---|---|---|---|---|
| 8,155,280 B1* | 4/2012 | Or-Bach | ............... | H04M 3/493 379/88.13 |
| 8,340,255 B2* | 12/2012 | Rotsztein | ............ | H04M 3/5191 379/88.01 |
| 2002/0133521 A1* | 9/2002 | Campbell | ............... | G06F 17/21 715/256 |
| 2003/0038754 A1* | 2/2003 | Goldstein | ............... | G06F 3/013 345/7 |
| 2005/0102355 A1* | 5/2005 | White | ................. | H04M 3/5232 709/204 |
| 2006/0239422 A1* | 10/2006 | Rinaldo | ................ | H04M 3/493 379/88.16 |
| 2008/0095330 A1* | 4/2008 | Jin | ........................ | H04M 3/493 379/88.13 |

(Continued)

OTHER PUBLICATIONS

Johnston, Alan B. et al., "WebRTC: APIs and RTCWEB Protocols of the HTML5 Real-Time Web," 2nd Edition (2013 Digital Codex LLC), Jun. 2013, 254 pages.

(Continued)

*Primary Examiner* — Ariel Mercado
(74) *Attorney, Agent, or Firm* — Sheridan Ross P.C.

(57) ABSTRACT

Interactive contact center menu traversal via text stream interaction is disclosed. A user device establishes an interactive session with a server device. The user device receives, from the server device, a first text stream comprising a first contact center prompt. The user device scrolls a plurality of text components of the first text stream on a display over a first text stream presentation period of time, with text components presented earlier in time being replaced on the display with subsequent text components. The user device receives, from a user, a first user input in response to the first text stream and communicates the first user input to the server device.

12 Claims, 15 Drawing Sheets

(56) References Cited

U.S. PATENT DOCUMENTS

| | | | | |
|---|---|---|---|---|
| 2012/0105486 A1* | 5/2012 | Lankford | ............... | G06F 3/013 |
| | | | | 345/661 |
| 2012/0256967 A1* | 10/2012 | Baldwin | ................ | G06F 3/013 |
| | | | | 345/684 |
| 2014/0101263 A1* | 4/2014 | Wu | ........................ | H04L 51/18 |
| | | | | 709/206 |
| 2014/0119531 A1* | 5/2014 | Tuchman | ............ | H04M 3/5166 |
| | | | | 379/265.09 |
| 2015/0019994 A1* | 1/2015 | Freudenthaler | ......... | G06F 9/452 |
| | | | | 715/748 |
| 2015/0286873 A1* | 10/2015 | Davis | ....................... | G06F 3/00 |
| | | | | 382/103 |

OTHER PUBLICATIONS

Official Action with English Translation for Brazil Patent Application No. BR102015032692-0, dated Apr. 27, 2020 6 pages.
Official Action for India Patent Application No. 4916/MUM/2015, dated Aug. 25, 2020 (Attorney's Ref. No. 4366-951-IN) 6 pages.

* cited by examiner

INTERACTIVE CONTACT CENTER MENU TRAVERSAL VIA TEXT STREAM INTERACTION

TECHNICAL FIELD

The embodiments relate to interactions with a contact center, and in particular to contact center interactions via a user device having a relatively small form factor and limited display size.

BACKGROUND

End-user devices are increasingly designed with a reduced form factor as a primary goal, to reduce weight, bulk, and in many cases, costs. End-user devices that display information, however, have a competing need to provide a display that is legible to a user with average eyesight, limiting how small a display on such a device can be. In some cases, the display becomes a gating factor of the overall size of the device. Wearable devices, such as a watch, that are intended to be worn on a specific part of a human body inherently have very limited space for a display.

In addition to the display, devices often require a mechanism for the user to indicate to the device what information is desired to be viewed. Often one or more physical selection mechanisms, such as buttons, are provided on the device to implement a user interface that facilitates user interaction with the device. Such selection mechanisms must be of a sufficient size that they can be manipulated by a human finger, which again limits the extent to which the device can be reduced in size. This problem can be minimized by implementing only one or two buttons on the device, but this solution requires the user to memorize complex button sequences to initiate different commands. Such user interfaces are often perceived by users as difficult to use, because the complex button sequences are easily forgotten.

It is often necessary for an individual to contact an entity, such as a company, to resolve problems the individual is encountering, such as product issues, service issues, billing issues, and the like. Many companies handle customer calls via a contact center device, which requires a customer to listen to a contact center menu of options and enter keystrokes or audio commands to traverse the contact center menu. Unfortunately, conventional contact center menus do not lend themselves to user devices having a limited display capacity. Accordingly, it would be desirable to facilitate contact center interactions with a user device having a limited display capacity to enable users with such devices to obtain necessary support from an entity.

SUMMARY

The embodiments relate to interactive contact center menu traversal via text stream interaction. In one embodiment, a user device establishes an interactive session with a server device. The user device receives, from the server device, a first text stream comprising a first contact center prompt. The user device scrolls a plurality of text components of the first text stream on a display over a first text stream presentation period of time, with text components presented earlier in time being replaced on the display with subsequent text components. The user device receives, from a user, a first user input in response to the first text stream, and communicates the first user input to the server device.

In one embodiment, in response to communicating the first user input, the user device receives, from the server device, a second text stream comprising a second contact center prompt. The user device scrolls a plurality of text components of the second text stream on the display over a second text stream presentation period of time. The user device receives, from the user, a second user input in response to the second text stream. The user device communicates the second user input to the server device.

In one embodiment, the user device analyzes an eye system of the user while concurrently scrolling the text components on the display and detects, based on analyzing the eye system, the first user input.

In another embodiment, a server device establishes an interactive session with a user device. The server device accesses a user profile associated with the user device. The server device provides a first text stream that comprises a predetermined contact center prompt to the user device. The server device receives, from the user device, a first user input. Based on the user input and the user profile, the server device dynamically generates a user-specific prompt menu comprising a plurality of user-specific contact center prompts in a defined processing sequence. The server device provides a second text stream comprising a user-specific contact center prompt to the user device.

In one embodiment, the server device provides a user-specific contact center prompt identifier to the user device in conjunction with the second text stream. The server device receives, from the user device, a second user input and the user-specific contact center prompt identifier, and accesses the user-specific prompt menu based on the user-specific contact center prompt identifier.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
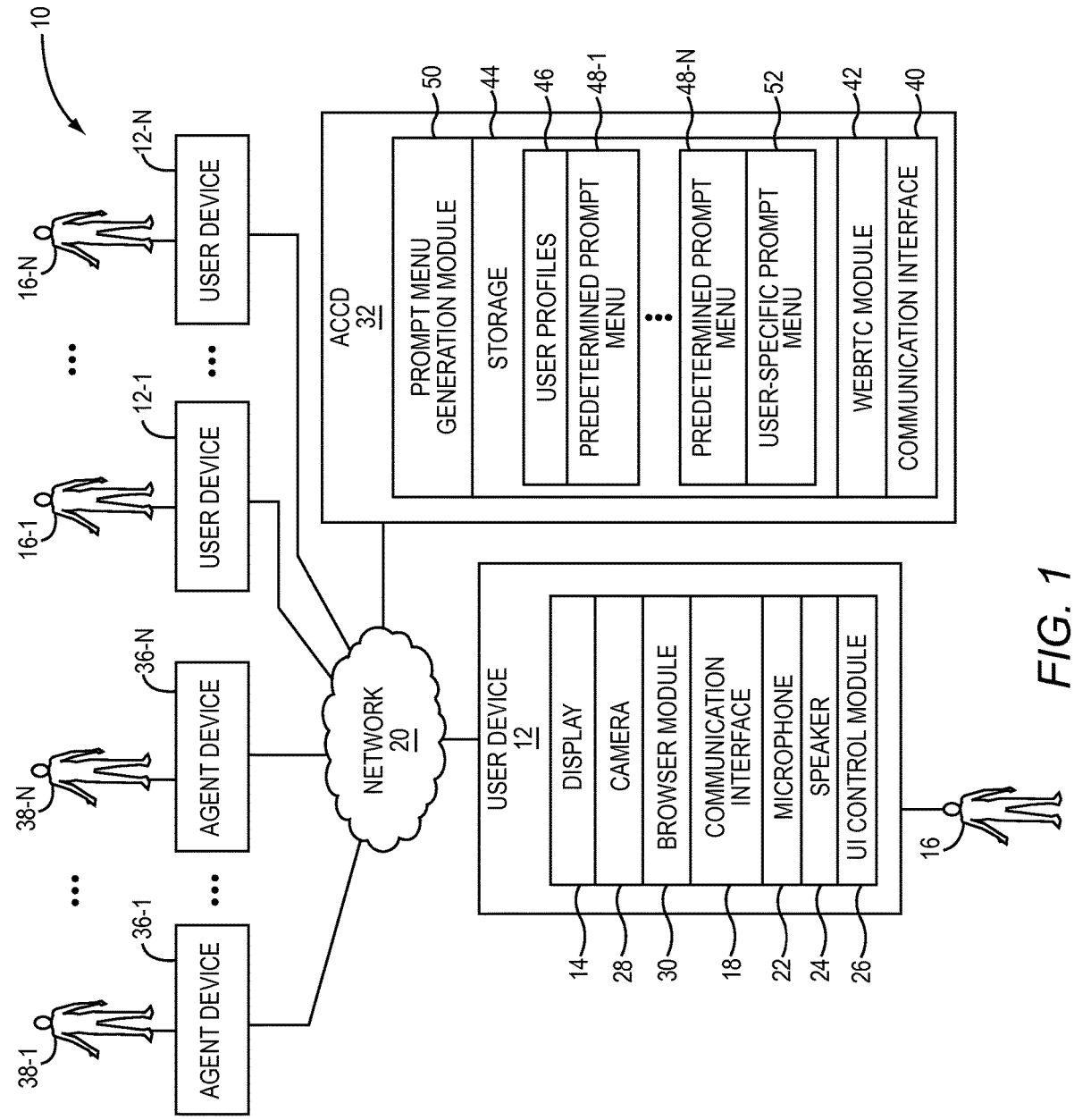
FIG. 1 is a block diagram of a system in which embodiments may be practiced.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first text stream" and "second text stream," and does not imply a priority, a type, an importance, or other attribute, unless otherwise stated herein.

Some embodiments may optionally utilize Web Real-Time Communications (WebRTC) to implement certain functionality disclosed herein. WebRTC is a set of standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, 2nd Edition (2013 Digital Codex LLC), which is incorporated herein by reference in its entirety.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF).

To establish a WebRTC interactive flow (e.g., a real-time video, audio, and/or data exchange), two WebRTC clients may retrieve WebRTC-enabled web applications, such as HTML5/JavaScript web applications, from a web application server. Through the web applications, the two WebRTC clients then engage in a dialogue for initiating a peer connection over which the WebRTC interactive flow will pass. The peer connection initiation dialogue includes any data transmitted between the two WebRTC clients and/or the web application server facilitating the establishment of the WebRTC interactive flow. As non-limiting examples, the peer connection initiation dialogue may include WebRTC session description objects, HTTP header data, certificates, cryptographic keys, and/or network routing data. The peer connection initiation dialogue may also include a media negotiation to communicate and reach an agreement on parameters that define characteristics of the WebRTC interactive flow.

In some embodiments, the media negotiation may be implemented via a WebRTC offer/answer exchange. A WebRTC offer/answer exchange typically occurs via a secure network connection such as a Hypertext Transfer Protocol Secure (HTTPS) connection or a Secure WebSockets connection. In a WebRTC offer/answer exchange, a first WebRTC client on a sender computing device sends an "offer" to a second WebRTC client on a recipient computing device. The offer includes a WebRTC session description object that specifies media types and capabilities that the first WebRTC client supports and prefers for use in the WebRTC interactive flow. The second WebRTC client then responds with a WebRTC session description object "answer" that indicates which of the offered media types and capabilities are supported and acceptable by the second WebRTC client for the WebRTC interactive flow. It is to be understood that the peer connection initiation dialogue may employ mechanisms other than a WebRTC offer/answer exchange to establish a WebRTC interactive flow between WebRTC clients.

Once the peer connection initiation dialogue is complete, the WebRTC clients may then establish a direct peer connection with one another, and may begin an exchange of media or data packets transporting real-time communications. The peer connection between the WebRTC clients typically employs the Secure Real-time Transport Protocol (SRTP) to transport real-time media flows, and may utilize various other protocols for real-time data interchange.

FIG. 1 is a block diagram of a system 10 in which embodiments may be practiced. The system 10 includes a user device 12, which is a computing device that has a relatively small form factor and limited display, or a limited display area of a larger display. The user device 12 may comprise, by way of non-limiting example, a fitness device, a timekeeping device, a news or information device, or a smartphone or a computing tablet that utilizes a limited portion of its display to display scrolling functionality. In some embodiments, the user device 12 may be a wearable device, such as may be worn on a body part, such as a wrist, or on the face in the form of wearable headgear, such as Google Glass. In some embodiments, the user device 12 may have a very small form factor that is dictated primarily by the size of a display 14, on which textual information, in the form of a text stream, may be presented to a user 16. The text streams may have a display length that exceeds a size of the display 14, and thus cannot be completely presented on the display 14 at a single instant in time. In some embodiments, the user device 12 may have input controls, such as touch screen capabilities, or one or more buttons, dials, or the like, to facilitate the receipt of user inputs from the user 16.

The user device 12 includes one or more communication interfaces 18 that facilitate communications with a network 20 using any desired communication technology, such as, by way of non-limiting example, cellular wireless technologies, local area network wireless technologies, such as Wi-Fi®, or other wireless technologies such as Bluetooth®, ZigBee®, or the like. Alternatively, the user device 12 may interact with a local device, such as a smartphone, which has network access to the network 20. The network 20 may comprise any proprietary or public network, or combination thereof, that facilitates communications between the various elements discussed herein.

The user device 12 may also include a microphone 22, and/or an input port to facilitate the connection of the microphone 22 thereto, to enable the user device 12 to process sounds, such as a voice of the user 16. Similarly, the user device 12 may include a speaker 24, or an output port to facilitate the connection of the speaker 24 thereto, to enable the user device 12 to emit sounds, such as a voice of a called party, to the user 16.

The user device 12 may also include a user interface (UI) control module 26 that may provide certain functionality, as described in greater detail herein, in response to inputs of the user 16. The inputs may be provided by the user 16 via any one or more of a variety of different mechanisms, such as, by way of non-limiting example, voice, soft buttons implemented via a touch screen, mechanical buttons or other "hard" input mechanisms implemented on the user device 12 (not illustrated), and the like. In one embodiment, the user device 12 includes a viewer-facing camera 28 that can generate video imagery at a framerate, such as 30 or 60 frames per second as non-limiting examples, and which can be used to detect inputs of the user 16, as will be discussed in greater detail herein. In some embodiments, as will be discussed in greater detail herein, the user device 12 may include a browser module 30 that facilitates some of the functionality described herein.

The system 10 also includes a server device, referred to herein as an automated contact center device (ACCD) 32. While for purposes of illustration the server device is depicted as a single computing device, in other embodiments the functionality discussed herein with regard to the server device may be implemented in multiple computing devices. Moreover, in some embodiments the server device may be a part of a cloud-based system interacting with device-based applications typically found, for example, in Apple iOS or Android mobile application models. Among other features, in an in-bound mode, the ACCD 32 operates to receive calls from user devices 12, 12-1-12-N associated with respective users 16, 16-1-16-N who seek some type of information, such as customer support. The ACCD 32 facilitates a connection between user devices 34 and agent devices 36-1-36-N (generally, agent devices 36) so that a particular agent 38-1-38-N can provide the desired support to the user 16. The term "call" as used herein is not limited to traditional voice calls, and includes any type of interactive session request that may be used to initiate, or establish, an interactive session, which may comprise, by way of non-limiting example, a voice session, a video session, a text chat session, or the like. The ACCD 32 includes one or more communication interfaces 40 that facilitate communications with the network 20 using any desired communication technology. In some embodiments, the ACCD 32 may communicate, at least in part, with the user device 12 via the WebRTC protocol. The ACCD 32 may implement the WebRTC protocol via a WebRTC module 42 that communicates with the browser module 30 that executes on the user device 12. However, it is noted that the communications discussed herein between the user device 12 and the ACCD 32 may be implemented using any desired protocol or suite of protocols, and the embodiments are not limited to the use of the WebRTC protocol or any specific WebRTC interaction format or technology.

The ACCD 32 also includes, or is communicatively coupled to, a storage 44, such as, by way of non-limiting example, a hard-drive, a flash drive, or a network-attached storage device, which is configured to store various data. The storage 44 may include user profiles 46 which contain information about a corresponding user 16. A user profile 46 may include, by way of non-limiting example, information regarding past contact center interactions with the corresponding user 16, including the particular problem or issues addressed. For example, if the user 16 previously contacted the contact center regarding a network connection problem, the user profile 46 may contain information identifying the particular network connection problem as well as the ultimate resolution. The storage 44 also includes one or more predetermined prompt menus 48-1-48-N (generally, predetermined prompt menus 48). Each predetermined prompt menu 48 includes a sequence of contact center prompts that facilitates an interconnection between the user 16 and a particular agent 38. Upon initiation of a communication interaction with a user 16, a particular prompt sequence may be selected and processed based on information or criteria associated with the user 16, such as geographic location, gender, area code, time of day, day of week, or the like.

In one embodiment, a prompt menu generation module 50 of the ACCD 32 may generate a user-specific prompt menu 52 based on information contained in a user profile 46 associated with a user 16. The user-specific prompt menu 52 may be generated upon initiation of the communication interaction, or may be generated after the initiation of the communication interaction and upon determination that user inputs of the user 16 indicate a problem or issue similar or identical to a previous problem or issue.

Figure 2:
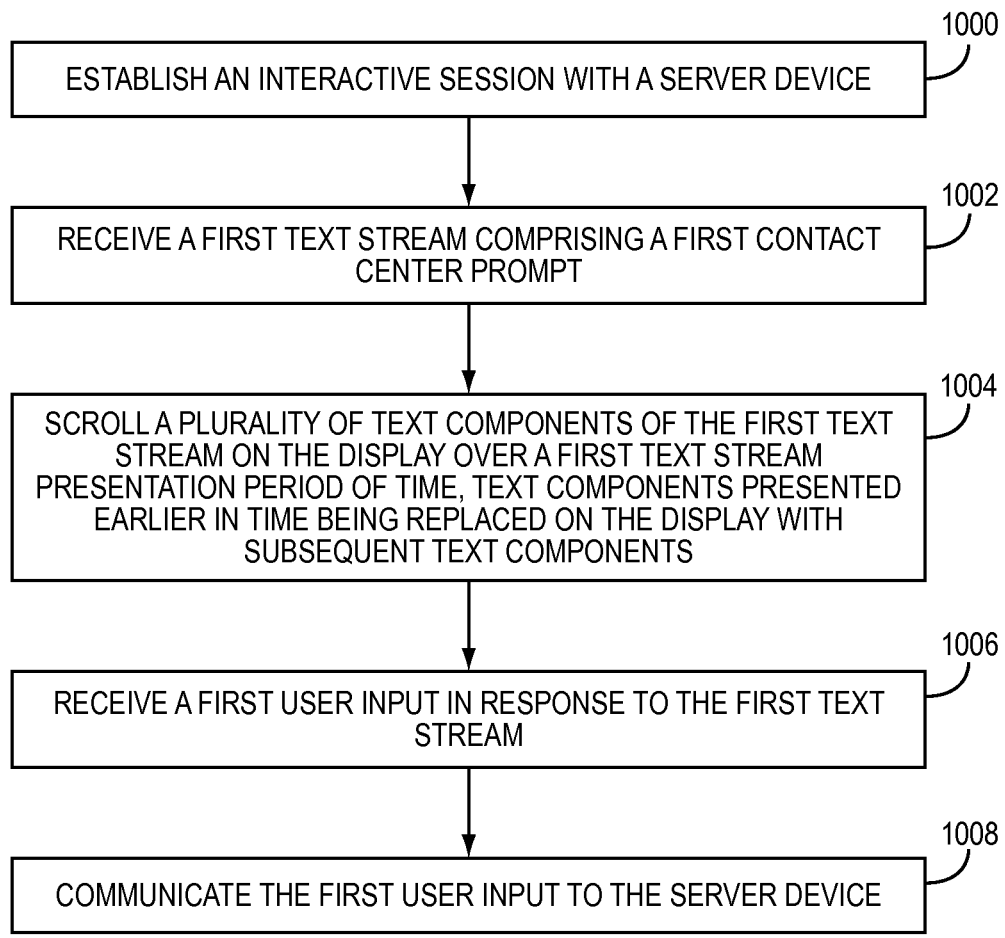
FIG. 2 is a flowchart of a method for interactive contact center menu traversal via text stream interaction according to one embodiment.

FIG. 2 is a flowchart of a method for interactive contact center menu traversal via text stream interaction according to one embodiment. FIG. 2 will be discussed in conjunction with FIG. 1. Initially, the user device 12 establishes an interactive session with the ACCD 32 (FIG. 2, block 1000). The interactive session may comprise, for example, a voice session, a video session, a text chat session, or the like. In response, the ACCD 32 may select a particular predetermined prompt menu 48 for processing. The predetermined prompt menu 48 comprises a plurality of contact center prompts, in the form of text streams. The user device 12 receives the first text stream, which comprises a first contact center prompt, from the ACCD 32 (FIG. 2, block 1002). The user device 12 scrolls a plurality of text components of the first text stream on the display 14 over a first text stream presentation period of time (FIG. 2, block 1004). As will be discussed in greater detail below, the text components may comprise individual components of the text streams, such as letters, words, or may comprise groups of words, depending on the size of the display 14, and/or the manner in which it is desired that such text components be presented on the display 14. In yet other embodiments, the text components may comprise letters, or characters, used to form words. Additionally, the embodiments may be utilized in conjunction with streaming technology, such as that available, by way of non-limiting example, by Spritz Technology, Inc., a Delaware corporation having a place of business at 35 Maple Street, Stoneham, Mass. 02180, United States.

The user device 12 receives a first user input in response to the first contact center prompt (FIG. 2, block 1006). The first user input may comprise, for example, a response which indicates a "yes" to the first contact center prompt, sometimes referred to as an "accept response," or may comprise a "no" response, sometimes referred to as a "reject response." In some embodiments, the first user response may comprise a text stream control command that requests a change in a characteristic in which the text components are presented on the display 14.

For purposes of illustration, assume that the first user input comprises an accept response. The first user input is communicated to the ACCD 32 (FIG. 2, block 1008). The ACCD 32 receives the first user input, and accesses the particular predetermined prompt menu 48. In one embodiment, the ACCD 32, as the particular predetermined prompt menu 48 is processed based on received user responses, maintains a processing sequence identifier that identifies a current location within the particular predetermined prompt menu 48. Based on the processing sequence identifier and the first user input, the ACCD 32 accesses a next contact center prompt, and communicates a second text stream to the user device 12 for presentation to the user 16.

Figure 3:
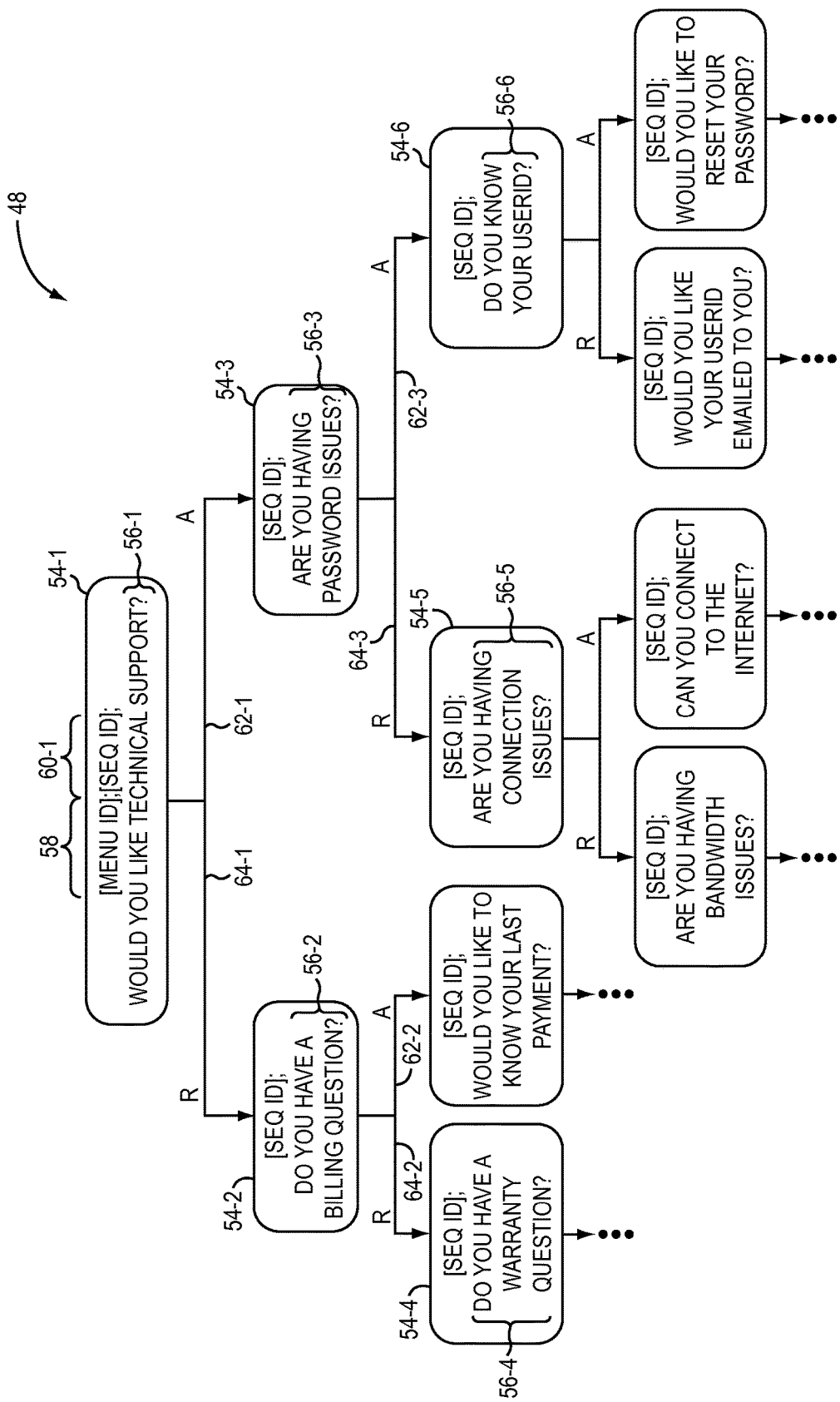
FIG. 3 is a block diagram of a predetermined prompt menu according to one embodiment.

FIG. 3 is a block diagram of a predetermined prompt menu 48 according to one embodiment. The predetermined prompt menu 48 comprises a plurality of contact center actions 54-1-54-6 (generally, contact center actions 54). For purposes of illustration, only some of the contact center actions 54 are individually labeled. Some of the contact center actions 54 comprise a text stream 56-1-56-6 (generally, text streams 56) made up of a plurality of text components. Each text stream 56 comprises a contact center prompt that prompts a user for a response. The predetermined prompt menu 48 may have an associated prompt menu identifier (ID) 58 that uniquely identifies the predetermined prompt menu 48 among the plurality of predetermined prompt menus 48. In one embodiment, the ACCD 32 may provide the prompt menu identifier 58 to the user device 12 in conjunction with the text streams 56. The user device 12 may then communicate the prompt menu ID 58 back to the ACCD 32 with a user response. The ACCD 32 may utilize the prompt menu ID 58 to determine the appropriate prompt menu 48 that is being processed for the user 16. In other embodiments, the ACCD 32 may store the prompt menu identifier 58 in the storage 44, and associate some other piece of information, such as a source address of the user device 12, to correlate user inputs from the user device 12 with the particular prompt menu 48.

Each contact center action 54 may include a processing sequence ID 60 that may be used to determine a current processing location in a respective predetermined prompt menu 48. In one embodiment, the ACCD 32 may maintain a current sequence location value that identifies a current processing sequence location of the respective predetermined prompt menu 48. The ACCD 32 initially sets the current sequence location value to a value of 0 to indicate that no processing of the respective predetermined prompt menu 48 has yet occured. As a contact center action 54 is processed, the ACCD 32 may set the current sequence location value to the processing sequence ID 60 of the most recently processed contact center action 54. Upon receipt of a user response, the ACCD 32 may utilize the current sequence location value to determine the particular contact center action 54 to which the user response applies. In one embodiment, the ACCD 32 may send the current sequence location value to the user device 12 in conjunction with a text stream. The user device 12 returns the current sequence location value in conjunction with the user input. The ACCD 32 may then utilize the current sequence location value to determine the appropriate processing sequence location within the predetermined prompt menu 48. In other embodiments, the ACCD 32 may store the current sequence location value in the storage 44 and associate some other piece of information, such as a source address of the user device 12, to correlate user inputs from the user device 12 with the current sequence location value.

The contact center actions 54 may be formed such that each contact center action 54 includes an accept link 62 (denoted "A" in FIG. 3) that refers to another contact center action 54 that is to be performed by the ACCD 32 in the event the user 16 provides an accept response to the command center prompt, and a reject link 64 (denoted "R" in FIG. 3) that refers to another contact center action 54 that is to be performed by the ACCD 32 in the event the user 16 provides a reject response to the command center prompt. The prompt menu 48 thus provides a relatively simple and intuitive processing sequence that can be rapidly traversed by the user 16 simply by indicating either an accept response or a reject response upon being presented with text streams that comprise the contact center prompts.

Figure 4:
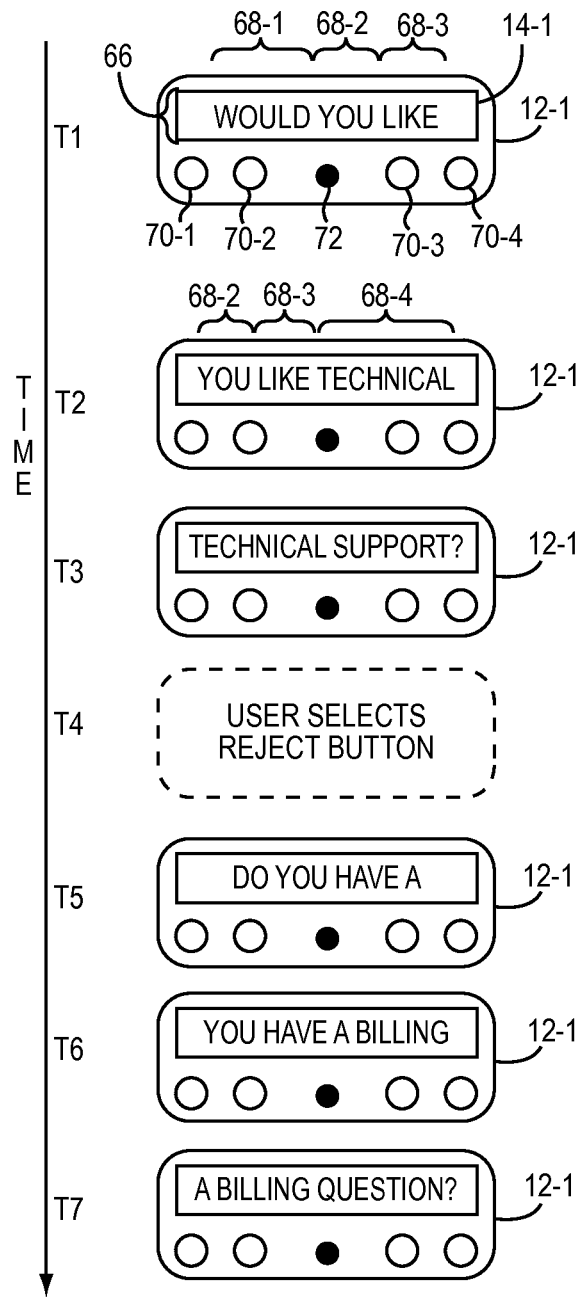
FIG. 4 is a block diagram illustrating a user device at a plurality of successive times according to one embodiment.

FIG. 4 is a block diagram illustrating a user device 12-1 at a plurality of successive times according to one embodiment. Except as otherwise stated herein, the user device 12-1 may be substantially similar to the user device 12 discussed above. The user device 12-1 has a display area 66 that makes up an entire display 14-1 and that is capable of concurrently presenting a plurality of text components 68-1-68-3 to the user 16. In one example, the text components 68 comprise words that are scrolled on the display 14-1 such that previously displayed text components 68 are removed from the left side of the display 14-1, and new text components 68 that are successive in a text stream are added to the right side of the display 14-1. It will be appreciated that the direction that words move across the display 14-1 may differ depending on language and or culture. The user device 12-1 includes four input controls 70-1-70-4 which may be utilized by the user 16 to interact with the user device 12-1. In some embodiments, the user device 12-1 may also include a front lens 72 through which the camera 28 can capture an eye system of the user 16, as discussed in greater detail below.

At a time T1, the text components 68-1-68-3 are scrolled on the display 14-1 for presentation to the user 16. The text components 68-1-68-3 are the first three words of the text stream 56-1 of the contact center action 54-1 (FIG. 3). At a time T2, the text component 68-1 is removed from the display 14-1; the text components 68-2-68-3 are shifted to the left; and a next successive text component 68-4 is added to the rightmost part of the display 14-1. This process repeats at a time T3, at which time the entire text stream 56-1 has been presented to the user 16.

Assume for purposes of illustration that in response to being presented with the text components 68, the user 16 selects an input control 70 that constitutes a reject response. For example, by convention, the user 16 may have knowledge that selection of the input control 70-1 constitutes an accept response, and selection of the input control 70-2 constitutes a reject response. Thus, the user 16 presses the input control 70-2. The user device 12-1 communicates the user input to the ACCD 32. In particular, the user device 12-1 provides information to the ACCD 32 indicating that the user 16 has provided a reject response. Referring briefly to FIG. 3, the ACCD 32 accesses the predetermined prompt menu 48, and determines, based on the current sequence location value, that the reject response is in response to the presentation of the text stream 56-1 of the contact center action 54-1. The ACCD 32 then follows the reject link 64-1 and performs the contact center action 54-2. In particular, the ACCD 32 accesses the text stream 56-2, and communicates the text stream 56-2 to the user device 12-1. The ACCD 32 also updates the current sequence location value to reflect the current processing sequence location.

Referring again to FIG. 4, the user device 12-1 receives the text stream 56-2, and at times T5-T6, scrolls the text stream 56-2 across the display 14-1 to present the text stream 56-2 to the user 16. The user 16, in response, may choose the input control 70-1 to provide an accept response, or the input control 70-2 to provide a reject response. This process may continue as the user 16 navigates the predetermined prompt menu 48.

Figure 5:
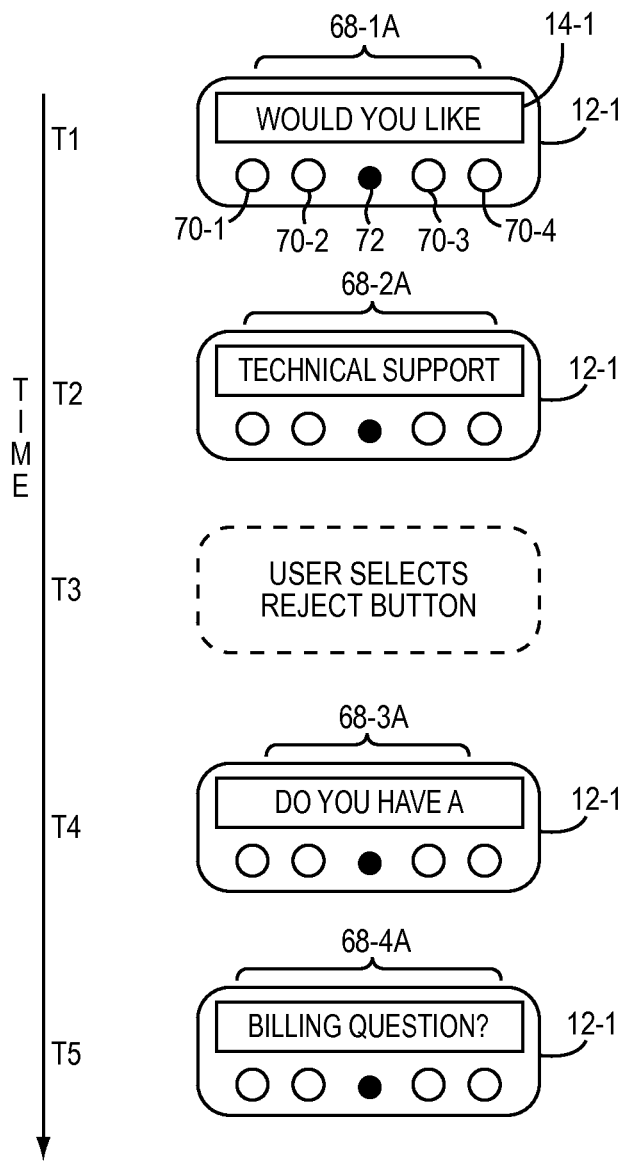
FIG. 5 is a block diagram illustrating the user device shown in FIG. 4 at a plurality of successive times according to another embodiment.

FIG. 5 is a block diagram illustrating the user device 12-1 at a plurality of successive times according to another embodiment. In this embodiment, each text component 68-1A-68-4A comprises a set of words that will fit within the display area of the display 14-1. The text component 68-1A comprises the three words "WOULD YOU LIKE," which are displayed concurrently on the display 14-1 at a time T1. At a time T2, the text component 68-1A is replaced with the text component 68-2A, which comprises the next successive set of words in the respective text stream, and which follows the words in the text component 68-1A.

At a time T3, the user 16 selects the input control 70-2 to indicate a reject response. The user device 12-1 provides information to the ACCD 32 indicating that the user 16 has provided a reject response. Referring briefly to FIG. 3, the ACCD 32 accesses the predetermined prompt menu 48, and determines, based on the current sequence location value that the reject response is in response to the presentation of the text stream 56-1 of the contact center action 54-1. The ACCD 32 then follows the reject link 64-1 and performs the contact center action 54-2. In particular, the ACCD 32 accesses the text stream 56-2, and communicates the text stream 56-2 to the user device 12-1. The ACCD 32 also updates the current sequence location value to reflect the current processing sequence location.

At a time T4, the user device 12-1 displays a text component 68-3A of the text stream 56-2 on the display 14-1. At a time T5, the user device 12-1 displays a text component 68-4A of the text stream 56-2 on the display 14-1. This process may continue as the user 16 navigates the prompt menu 48.

Figure 6:
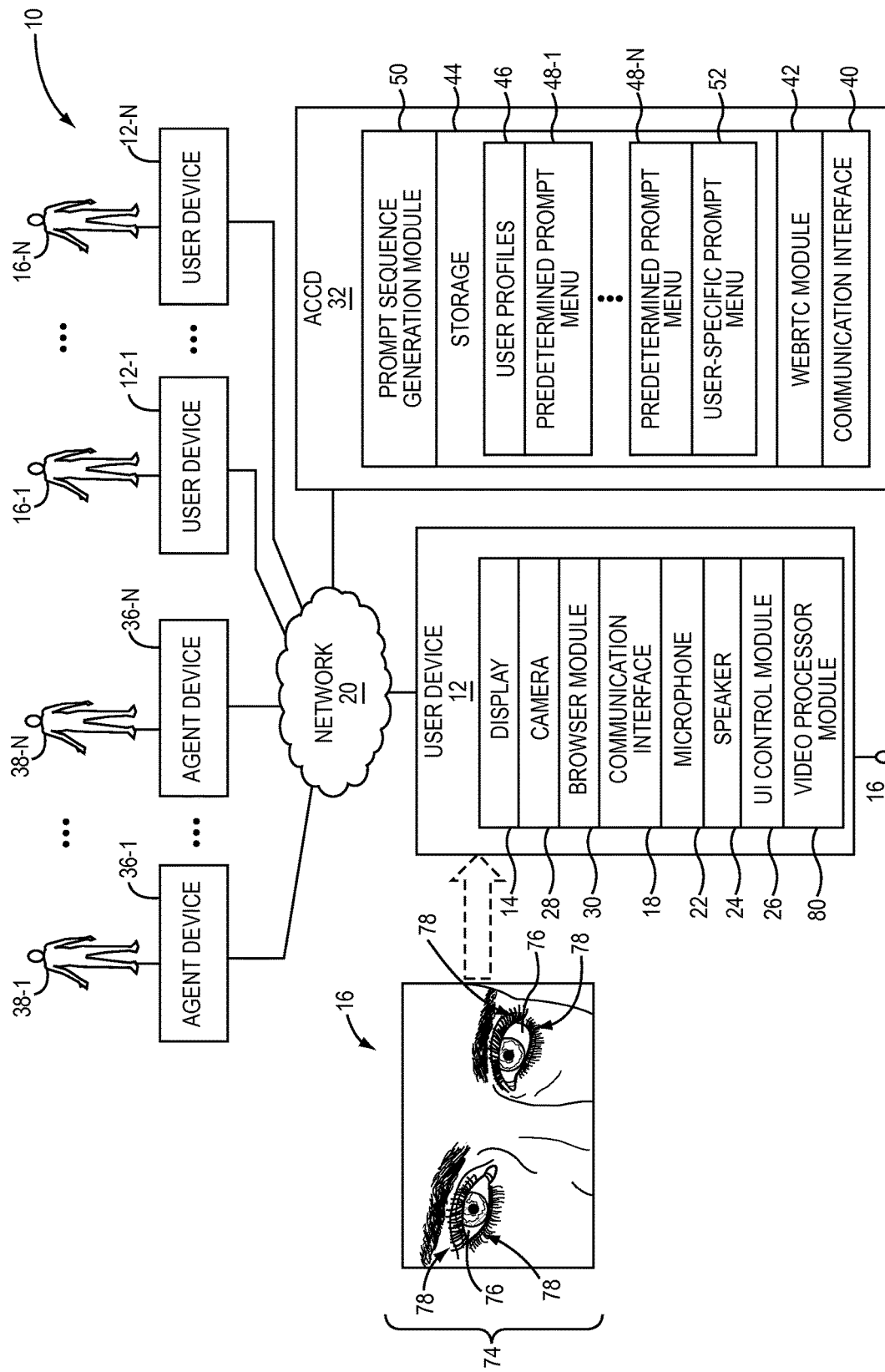
FIG. 6 is a block diagram of the system illustrated in FIG. 1 according to another embodiment.

FIG. 6 is a block diagram of the system 10 according to another embodiment. In this embodiment, the viewer-facing camera 28 generates video imagery at a framerate, such as 30 or 60 frames per second as non-limiting examples, of a desired scene, including, for example, an eye system 74 of the user 16. The eye system 74 may include one or two eyes 76, and corresponding eyelids 78. A lens of the camera 28 may be oriented in a direction toward a viewer of the display 14, to facilitate capturing the eye system 74 when the user 16 is viewing the display 14. A video processor module 80 is coupled to the camera 28 and is configured to process the video imagery and identify movements of the eye system 74. Such movements may comprise any desired actions, including, by way of non-limiting example, changing a direction of a gaze of any eye 76, such as right-to-left, or up-to-down, closing of a single eyelid 78 or both eyelids 78 for a predetermined period of time, blinking an eyelid 78 a predetermined number of times within a predetermined period of time, or the like. While several examples have been provided, the embodiments are not limited to any particular movements of the eye system 74, and the video processor module 80 may be configured to detect and identify any desired movement of the eye system 74.

The UI control module 26 receives, from the video processor module 80, the identification of a particular eye control movement or action, and translates the eye control action into a control command that is interpreted as user input of the user 16. Control commands may comprise, by way of non-limiting example, a pause control command, an increase pace control command, a decrease pace control command, a previous text stream control command, a backup control command, an accept control command and a reject control command. It will be appreciated that the control commands provided herein are merely examples.

In one embodiment, the video processor module 80 may identify to the UI control module 26 a detected eye movement with a predetermined value that is passed or otherwise provided to the UI control module 26. As an example, the UI control module 26 may receive a numeric value of 2 from the video processor module 80, which indicates, for example, that the video processor module 80 detected that the eyelids 78 of the user 16 remained closed for three seconds. The UI control module 26 may translate this eye control movement into an accept response user input, and the user device 12 may communicate the accept response to the ACCD 32.

Figure 7A:
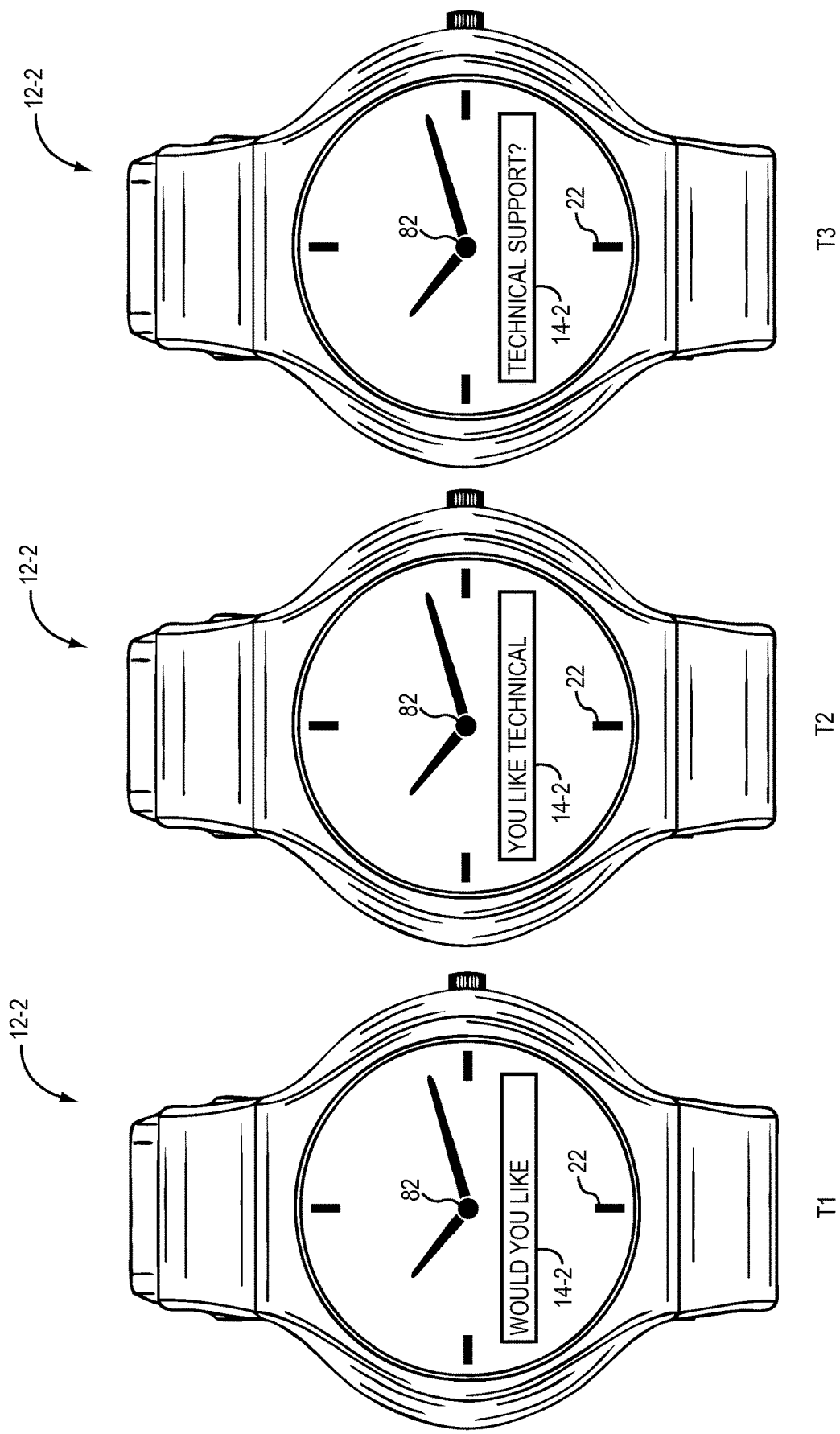
FIGS. 7A-7B illustrate a user device at a plurality of successive times according to another embodiment.
Figure 7B:
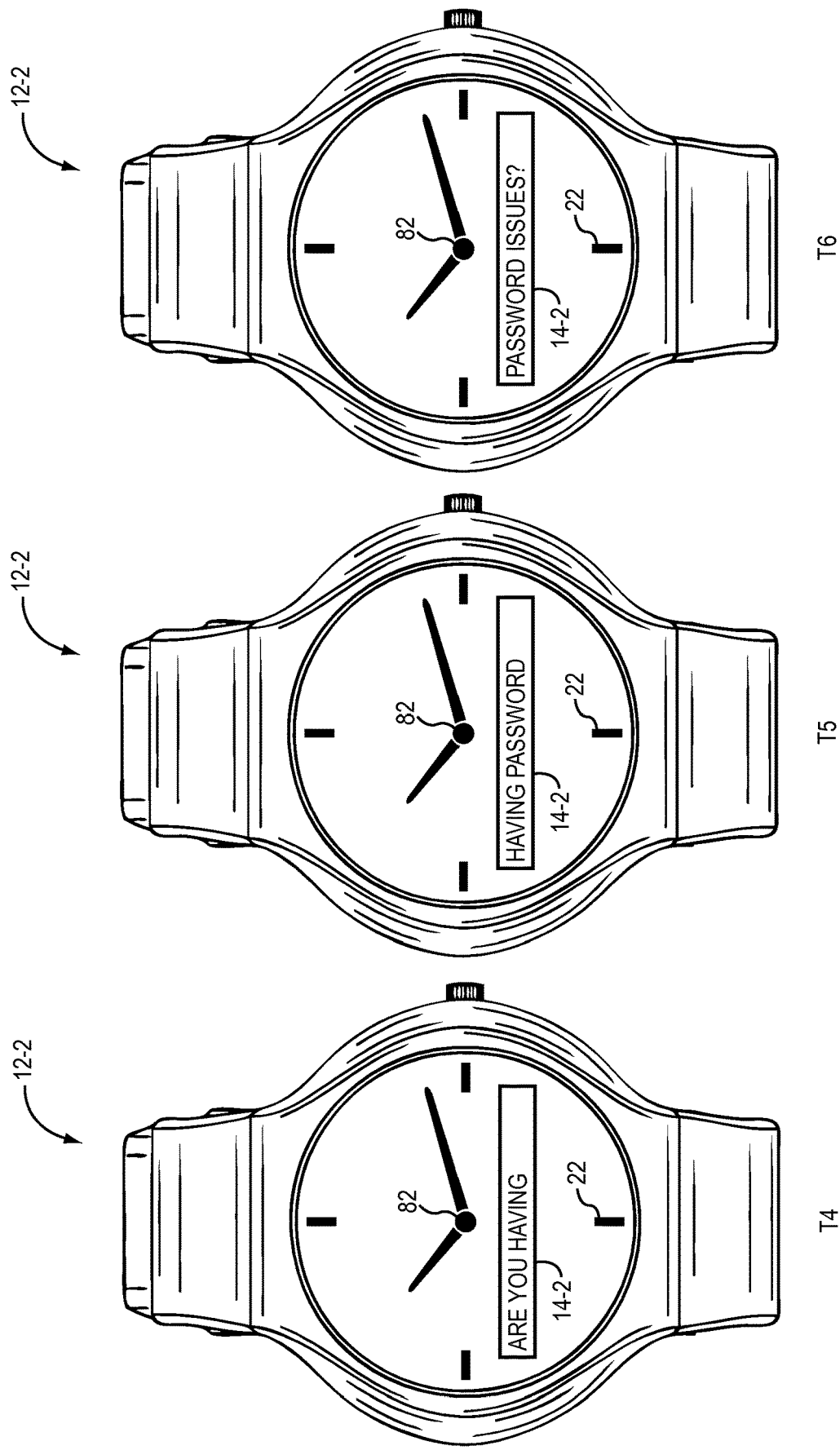

FIGS. 7A-7B illustrate a user device 12-2 at a plurality of successive times according to another embodiment. In this embodiment, the user device 12-2 is in the form factor of a wristwatch. The user device 12-2 includes a front lens 82 through which the camera 28 can capture imagery of the eye system 74 of the user 16. The user device 12-2 also includes a display 14-2 of a size insufficient to present a text stream at a single instant in time. The user device 12-2 also includes the microphone 22, which appears as an hour designator on a face of the wristwatch. Assume for purposes of illustration that the user 16 performs an action that causes the user device 12-2 to establish an interactive session with the ACCD 32. The action may be a predetermined eye movement, or may include audio commands captured by the microphone 22 and processed by the UI control module 26. Assume that in response to the establishment of the interactive session, the ACCD 32 accesses the predetermined prompt menu 48. The ACCD 32 recognizes that the current processing sequence location is at the beginning of the predetermined prompt menu 48, and sends the text stream 56-1 to the user device 12-2. Over periods of times T1-T3, the user device 12-2 scrolls the text components of the text stream 56-1 across the display 14-2.

Either concurrent with the scrolling of the text stream 56-1 across the display 14-2, or within a predetermined period of time after the text stream 56-1 has been scrolled on the display 14-2, the user 16 initiates an eye movement which is detected by the video processor module 80 and interpreted by the UI control module 26 as an accept response. The user device 12-2 communicates information indicating that the user input comprises an accept response.

In response, the ACCD 32 follows the accept link 62-1, and accesses the contact center action 54-3. The ACCD 32 communicates the text stream 56-3 to the user device 12-2. FIG. 7B illustrates the user device 12-2 scrolling the text stream 56-3 across the display 14-2 over periods of times T4-T6. This process may continue as the user 16 navigates the prompt menu 48.

Figure 8:
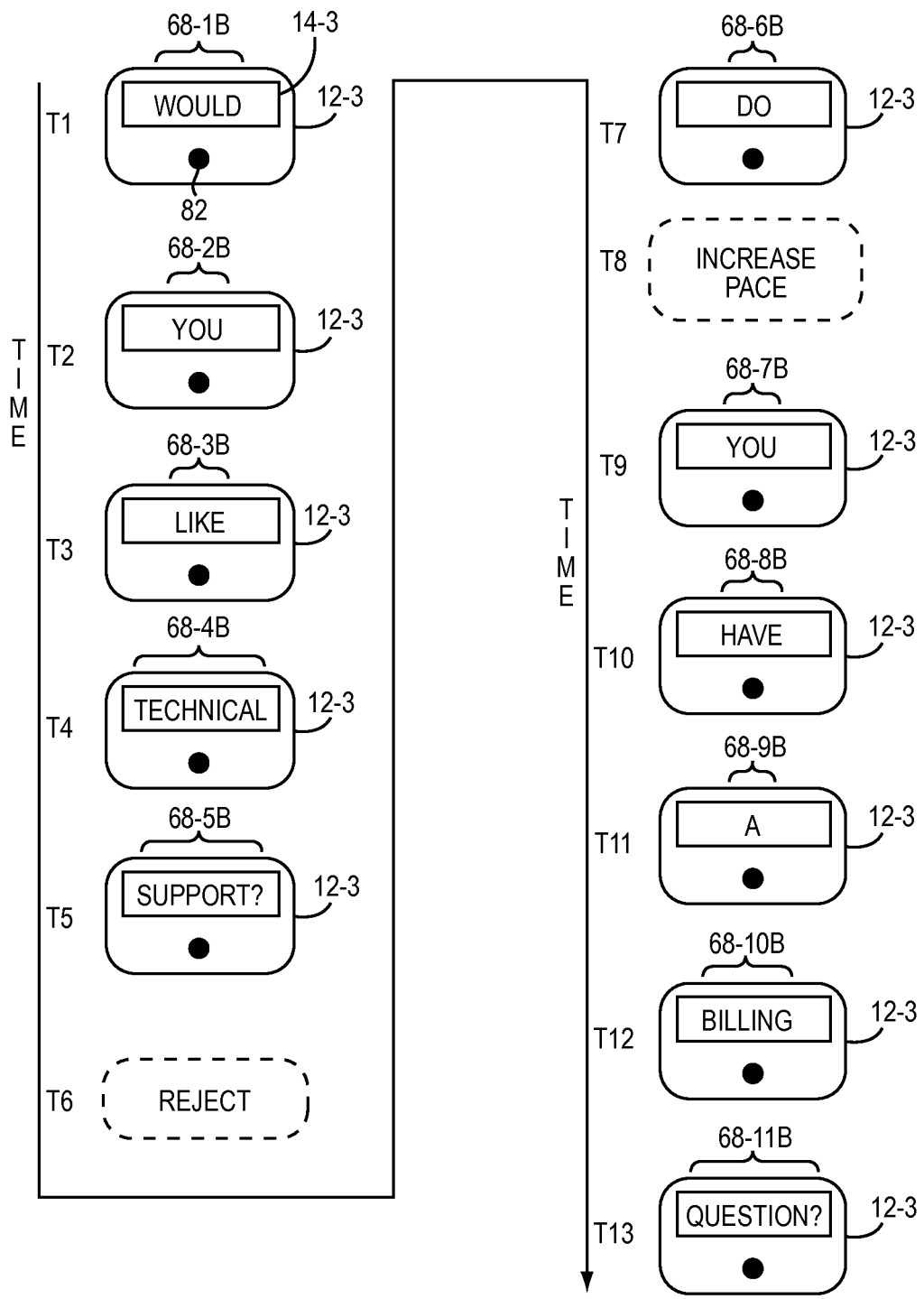
FIG. 8 is a block diagram of a user device according to another embodiment.

FIG. 8 is a block diagram of a user device 12-3 according to another embodiment. Except as otherwise stated herein, the user device 12-3 may be substantially similar to the user devices 12, 12-1-12-2 discussed above. The user device 12-3 comprises a relatively small display 14-3, and the front lens 82 through which the eye system 74 of the user 16 may be captured by the camera 28 (not illustrated). The user device 12-3 provides for presentation on the display 14-3 of a single word at a time, and thus the user device 12-3 may have a very small form factor. Each text component 68-1B-68-11B (generally, text components 68-B) comprises a single word. The text components 68-B may be provided for presentation on the display 14-3 at a particular pace, which, according to one embodiment, may be altered in response to appropriate eye control movements.

The user device 12-3 provides text components 68-1B-68-5B for presentation on the display 14-2 at successive times T1-T5 at a first pace. At a time T6, the user device 12-3 detects an eye movement that translates into a reject response. For example, the user 16 may have blinked her eyes twice rapidly. The user device 12-3 communicates information to the ACCD 32 indicating that the user input comprises a reject response. In response, the ACCD 32 follows the reject link 64-1, and accesses the contact center action 54-2. The ACCD 32 communicates the text stream 56-2 to the user device 12-3. The user device 12-3 receives the text stream 56-2 and at time T7 scrolls the first text component 68-6B on the display 14-3. At a time T8, the user 16 performs an eye movement that is detected by the video processor module 80 and interpreted by the UI control module 26 as an increase pace control command. For example, the user 16 may have glanced upwards. In response, the user device 12-3 scrolls text components 68-7B-68-11B over periods of time T9-T13 at a second pace that is a greater pace than the first pace. This process may continue as the user 16 navigates the prompt menu 48.

In one embodiment, user input may comprise a text stream control command that requests a change in a characteristic in which the text components are presented on the display 14-3. For example, the user 16 may issue a pause control command to cause the user device 12-3 to pause the presentation of text components 68 on the display 14-3. An increase pace control command causes the user device 12-3 to more quickly scroll text components 68 on the display 14-3. A decrease pace control command causes the user device 12-3 to more slowly scroll text components 68 on the display 14-3. The user 16 may issue a previous text stream control command, which the user device 12-3 may communicate to the ACCD 32. The ACCD 32 accesses the predetermined prompt menu 48 and determines the current processing sequence location. The ACCD 32 may then access a previously accessed contact center action 54, and resend the corresponding text stream to the user device 12-3. In this manner, the user 16 can relatively easily traverse both forward and backwards through the predetermined prompt menu 48. A backup control command causes the user device 12-3 to redisplay previous text components 68 of a text stream.

Figure 9A:
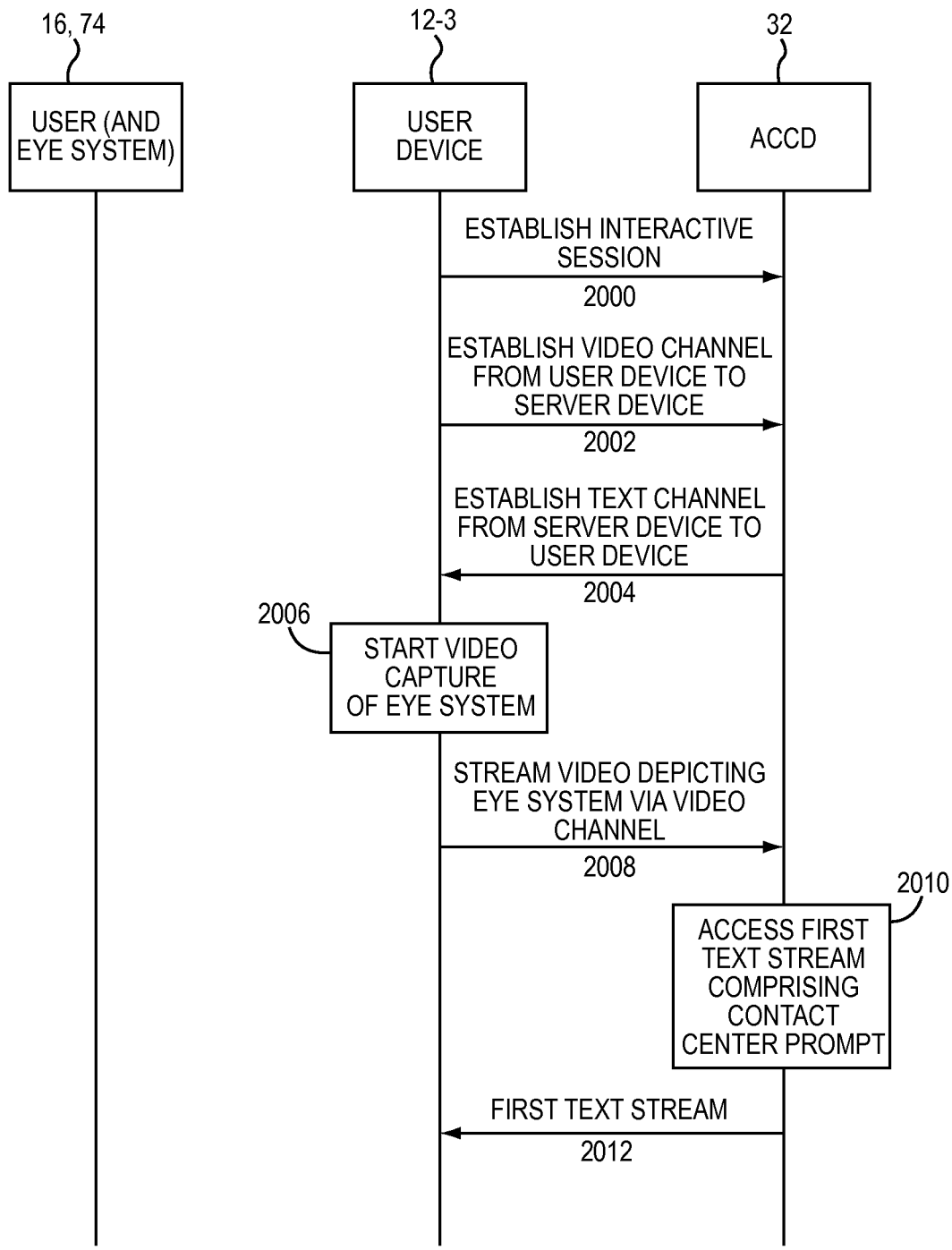
FIGS. 9A-9B are message flow diagrams that illustrate an example message flow between the user device illustrated in FIG. 8 and an automated contact center device (ACCD) according to another embodiment.
Figure 9B:
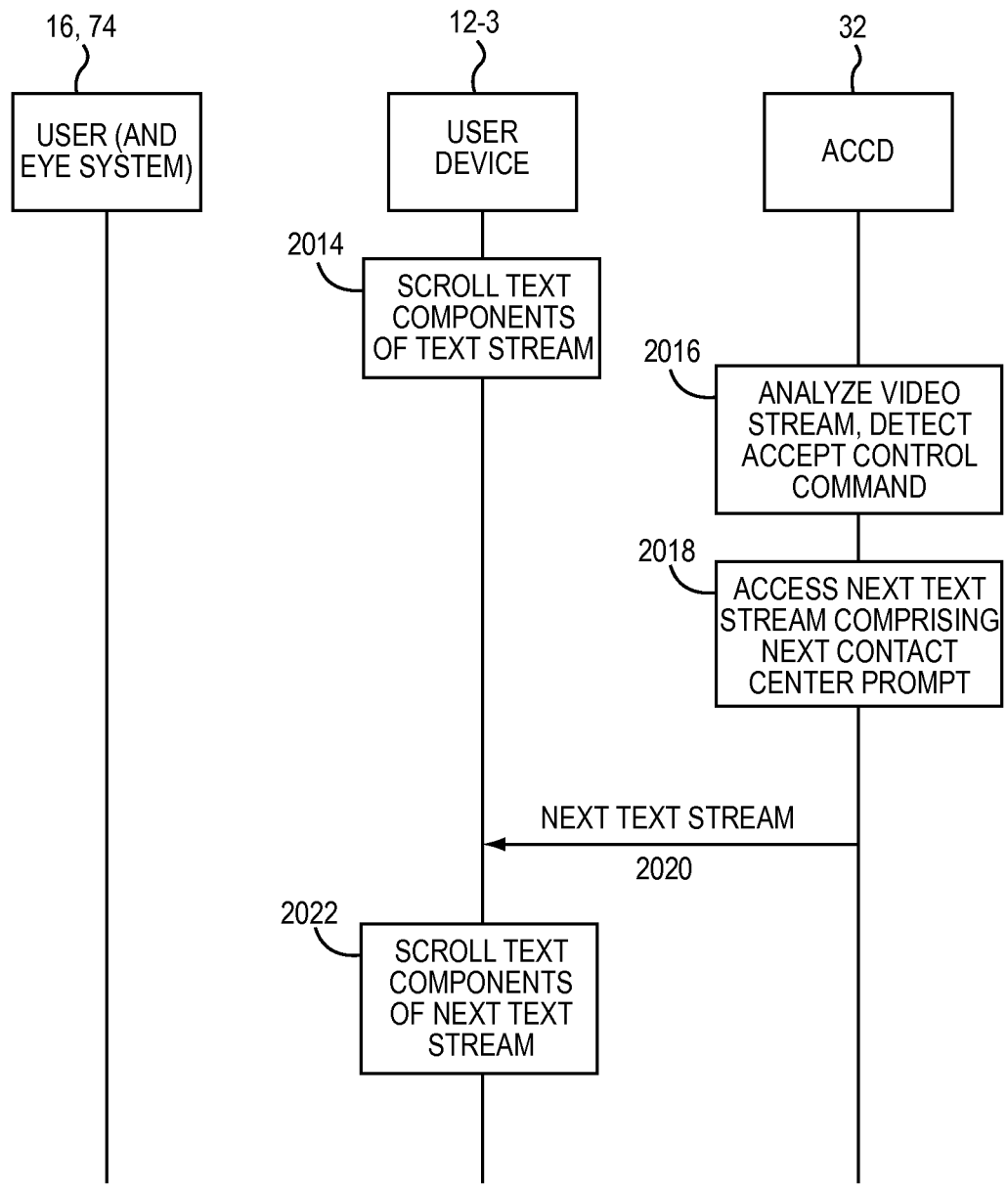

FIGS. 9A-9B are message flow diagrams that illustrate an example message flow between the user device 12-3 and the ACCD 32 according to another embodiment. In this embodiment, the user device 12-3 captures video imagery of the eye system 74 of the user 16 and sends the video imagery to the ACCD 32 for analysis and processing. Thus, in this embodiment, functionality associated with the video processor module 80 and UI control module 26 may be implemented on the ACCD 32. Any suitable mechanism or protocol may be utilized between the user device 12-3 and the ACCD 32. According to one embodiment, WebRTC is utilized.

Initially, the user device 12-3 establishes an interactive session with the ACCD 32 (block 2000). The user device 12-3 also establishes a video channel from the user device 12-3 to the ACCD 32 (block 2002). A text channel from the ACCD 32 to the user device 12-3 is established (block 2004). The user device 12-3 begins to capture video of the eye system 74 (block 2006). The video is streamed over the video channel to the ACCD 32 (block 2008). The ACCD 32 recognizes that the current processing sequence location is at the beginning of the predetermined prompt menu 48, and sends the text stream 56-1 to the user device 12-3 (blocks 2010-2012).

The user device 12-3 receives the first text stream and scrolls the text components of the first text stream on the display 14-2 (block 2014). Substantially concurrently therewith, the ACCD 32 analyzes the video stream received from the user device 12-3, and detects an accept response (block 2016). The ACCD 32 follows the accept link 62-1, and accesses the contact center action 54-3. The ACCD 32 communicates the text stream 56-3 to the user device 12-2 (block 2018-2020).

In some embodiments, the ACCD 32 may generate a user-specific prompt menu 52 based on information contained in a user profile 46 of a user 16. For example, the ACCD 32, based on the user profile 46 and responses to command center prompts, may recognize that the user 16 is likely encountering an issue that the user 16 has previously encountered. The ACCD 32, in this example, may generate a user-specific prompt menu 52 that contains user-specific contact center prompts in a defined processing sequence that may more quickly aid the user 16 in being connected with the relevant agent 38.

Figure 10:
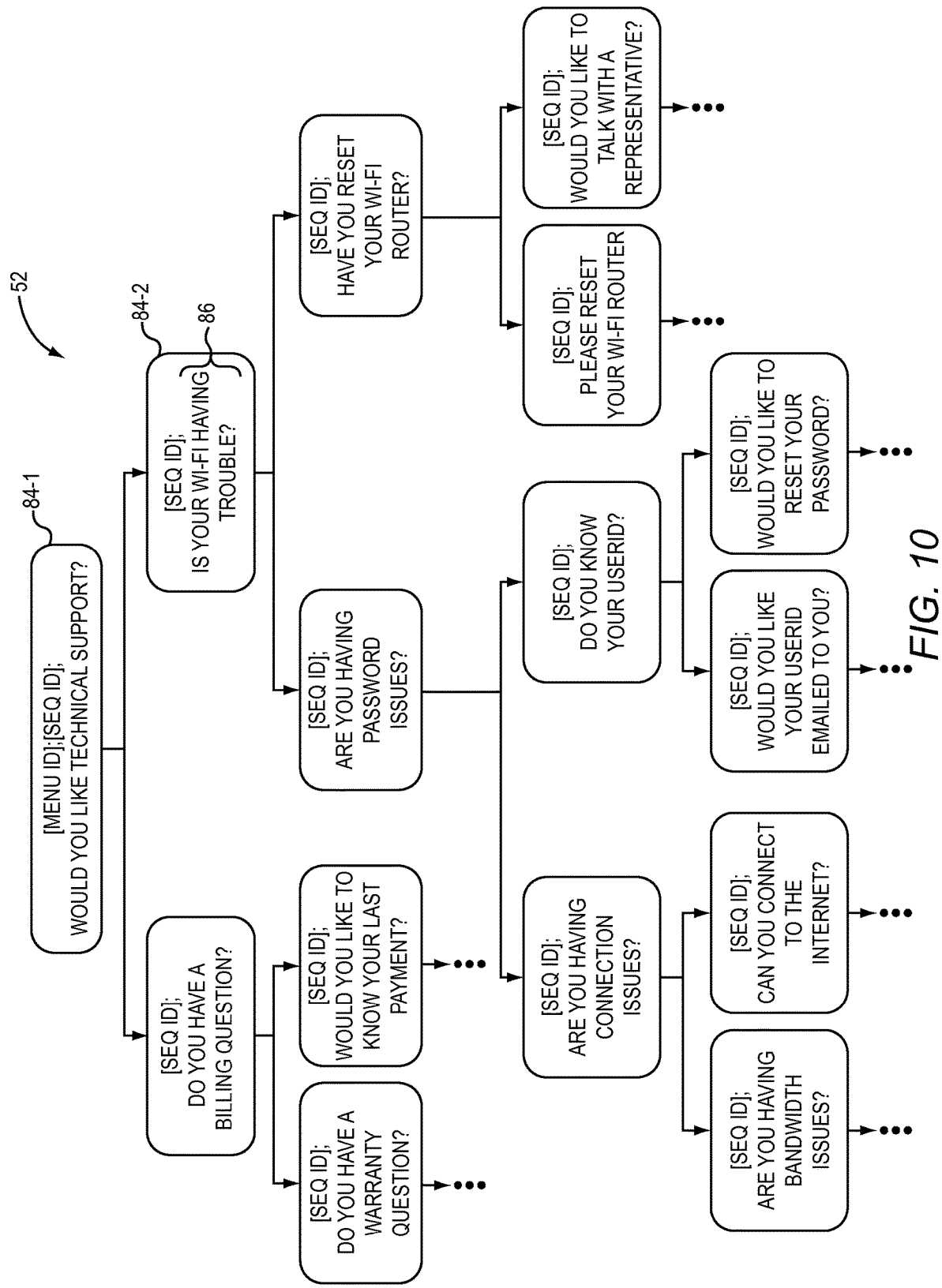
FIG. 10 is a block diagram of a user-specific prompt menu according to one embodiment.
Figure 11:
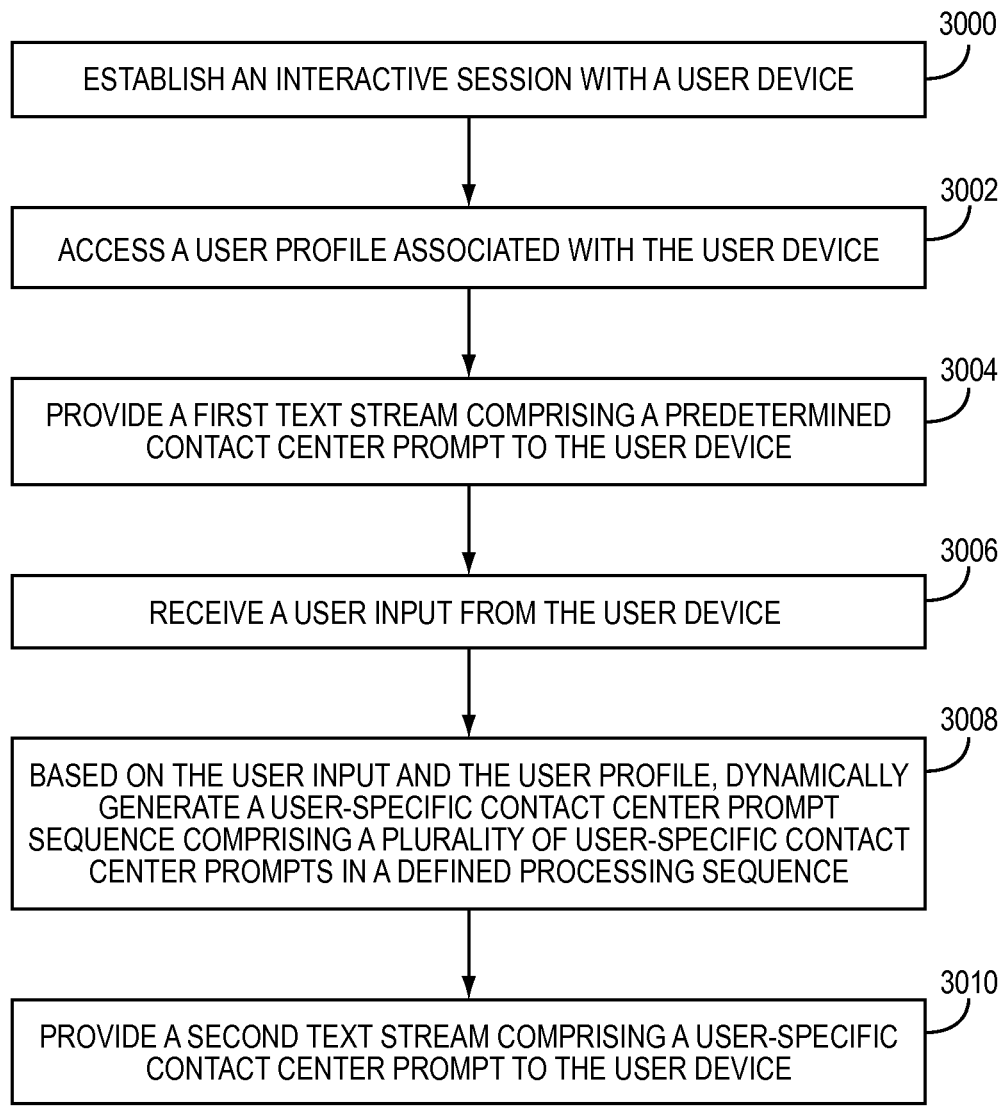
FIG. 11 is a flowchart of a method for generating a user-specific prompt menu according to one embodiment.

FIG. 10 is a block diagram of a user-specific prompt menu 52 according to one embodiment. FIG. 11 is a flowchart of a method for generating a user-specific prompt menu 52 according to one embodiment. FIG. 11 will be discussed in conjunction with FIG. 10. For purposes of illustration, assume that the previous time the user 16 contacted the contact center, the user 16 had a problem with her Wi-Fi® connection. The user device 12-3 establishes an interactive session with the ACCD 32 (FIG. 11, block 3000). The ACCD 32 accesses a user profile 46 associated with the user 16, and determines that the previous interaction with the user 16 involved a Wi-Fi® connection problem (FIG. 11, block 3002). Initially, the ACCD 32 may access a particular predetermined prompt menu 48 for processing.

The ACCD 32 sends a first text stream that includes a predetermined contact center prompt to the user device 12-3 (block 3004). For example, the ACCD 32 may access the predetermined prompt menu 48 illustrated in FIG. 3, and utilize the text stream 56-1. The ACCD 32 receives an accept response from the user device 12-3 (FIG. 11, block 3006). Based on the accept response, the ACCD 32 determines that the user 16 has a technical support issue, and based on the user profile 46, the ACCD 32 knows that the previous technical support issue involves a Wi-Fi® connection problem. In response, the ACCD 32 generates the user-specific prompt menu 52, such that the next contact center action 84-2 includes a text stream 86 that comprises a user-specific command prompt that prompts the user 16 to determine if the user 16 has a Wi-Fi® connection issue (FIG. 11, block 3008). The ACCD 32 may also generate and associate a user-specific contact center prompt identifier with the user-specific prompt menu 52. The ACCD 32 sends the text stream 86 to the user device 12-3 (FIG. 11, block 3010). In one embodiment, the ACCD 32 may also send the user-specific contact center prompt identifier to the user device 12-3 in conjunction with the text stream 86. The user device 12-3 receives the text stream 86, and receives a user input in response to the text stream 86. The user device 12-3 may communicate information that identifies the user input, as well as the user-specific contact center prompt identifier, to the ACCD 32. The ACCD 32 may use the user-specific contact center prompt identifier to identify the appropriate user-specific prompt menu 52, and continue processing the user-specific prompt menu 52. The generation of the user specific prompt menu 52, among other advantages, reduces the interactions necessary for the user 16 to be connected to the appropriate contact center agent 38.

Figure 12:
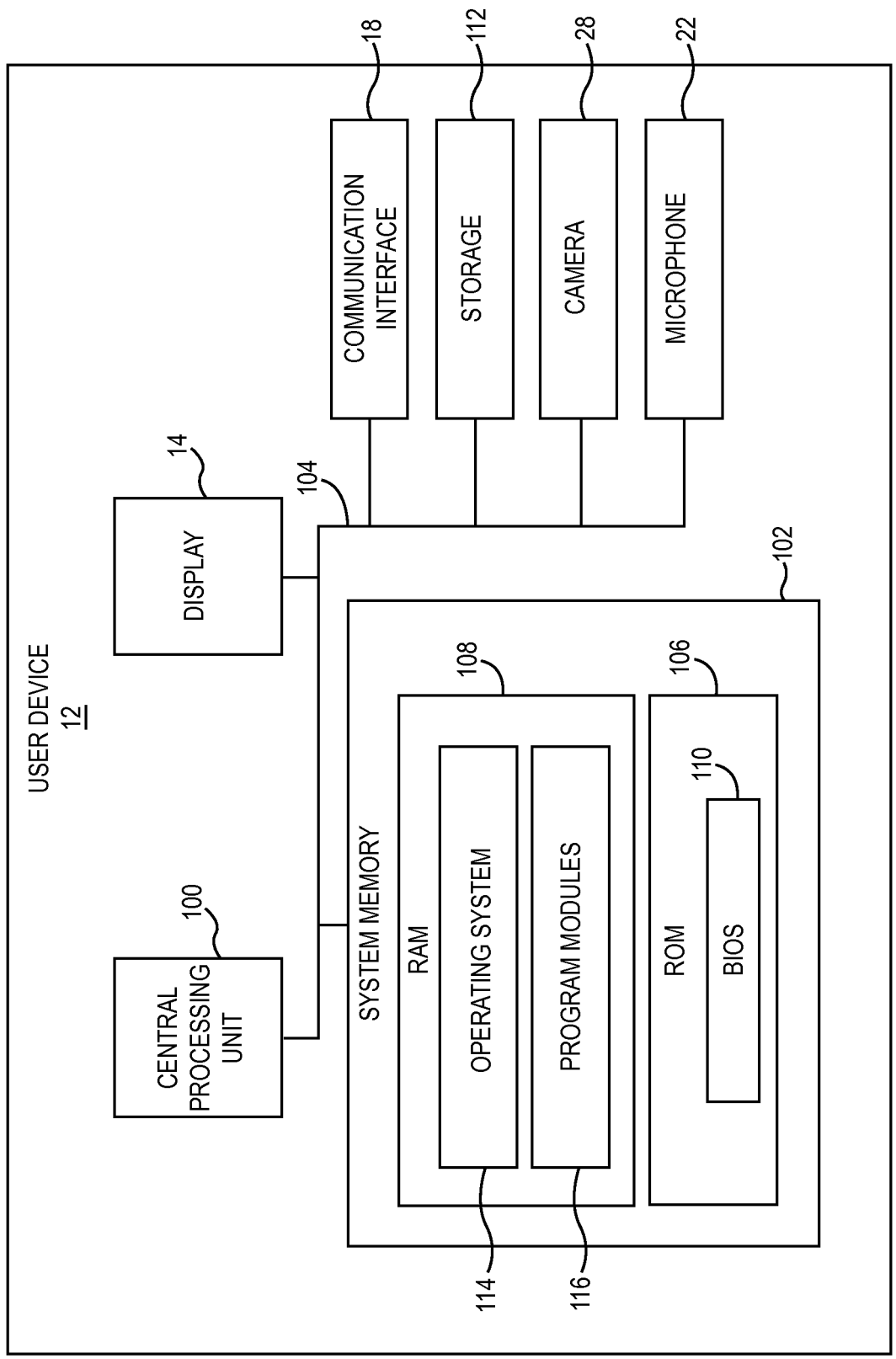
FIG. 12 is a block diagram of the user device illustrated in FIG. 1 according to one embodiment.

FIG. 12 is a block diagram of the user device 12 according to one embodiment. The user device 12 may comprise any computing or processing device capable of including firmware, hardware, and/or executing software instructions to implement the functionality described herein, such as a fitness device, a timekeeping device, a news or information device, or a smartphone or a computing tablet that utilizes a limited portion of its display to display scrolling functionality, as described in greater detail herein. The user device 12 includes a central processing unit 100, a system memory 102, and a system bus 104. The system bus 104 provides an interface for system components including, but not limited to, the system memory 102 and the central processing unit 100. The central processing unit 100 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read only memory (ROM), erasable programmable read only memory (EPROM), electrically erasable programmable read only memory (EEPROM), etc.) and/or volatile memory 108 (e.g., random access memory (RAM)). A basic input/output system (BIOS) 110 may be stored in the non-volatile memory 106, and can include the basic routines that help to transfer information between elements within the user device 12. The volatile memory 108 may also include a high-speed RAM, such as static RAM for caching data.

The user device 12 may further include or be coupled to a storage 112, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 112 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 112 and in the volatile memory 108, including an operating system 114 and one or more program modules 116, which may implement the functionality described herein in whole or in part, including, for example, functionality associated with the video processor module 80 and UI control module 26.

All or a portion of the embodiments may be implemented as a computer program product stored on a transitory or non-transitory computer-usable or computer-readable storage medium, such as the computer-readable storage 112, which includes complex programming instructions, such as complex computer-readable program code, configured to cause the central processing unit 100 to carry out the steps described herein. Thus, the computer-readable program code can comprise software instructions for implementing the functionality of the embodiments described herein when executed on the central processing unit 100. The central processing unit 100, in conjunction with the program modules 116 in the volatile memory 108, may serve as a controller for the user device 12 that is configured to, or adapted to, implement the functionality described herein. The user device 12 also includes the communication interface 18, camera 28, display 14, and optionally, the microphone 22.

Figure 13:
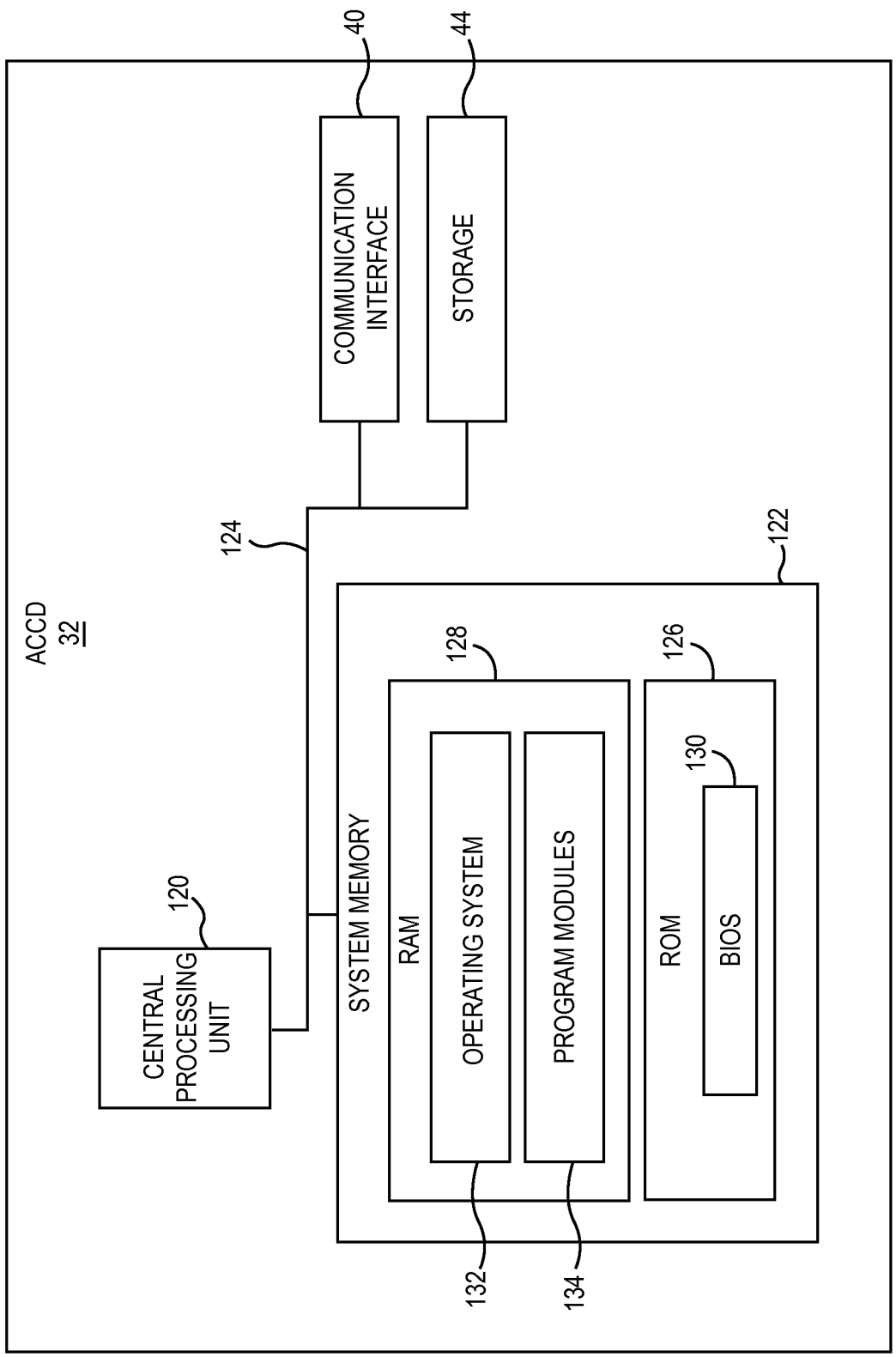
FIG. 13 is a block diagram of a server device according to one embodiment.

FIG. 13 is a block diagram of a server device, such as the ACCD 32, according to one embodiment. The ACCD 32 may comprise any computing or processing device capable of including firmware, hardware, and/or executing software instructions to implement the functionality described herein, such as a work station, desktop computer, telecommunications switch, server, laptop computer, or the like. The ACCD 32 includes a central processing unit 120, a system memory 122, and a system bus 124. The system bus 124 provides an interface for system components including, but not limited to, the system memory 122 and the central processing unit 120. The central processing unit 120 can be any commercially available or proprietary processor.

The system bus 124 may be any of several types of bus structures that may further interconnect to a memory bus (with or without a memory controller), a peripheral bus, and/or a local bus using any of a variety of commercially available bus architectures. The system memory 122 may include non-volatile memory 126 (e.g., read only memory (ROM), erasable programmable read only memory (EPROM), electrically erasable programmable read only memory (EEPROM), etc.) and/or volatile memory 128 (e.g., random access memory (RAM)). A basic input/output system (BIOS) 130 may be stored in the non-volatile memory 126, and can include the basic routines that help to transfer information between elements within the ACCD 32. The volatile memory 128 may also include a high-speed RAM, such as static RAM for caching data.

The ACCD 32 may further include or be coupled to the storage 44, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 44 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 44 and in the volatile memory 128, including an operating system 132 and one or more program modules 134, which may implement the functionality described herein in whole or in part, including, for example functionality associated with the prompt menu generation module 50, the WebRTC module 42, and the like.

All or a portion of the embodiments may be implemented as a computer program product stored on a transitory or non-transitory computer-usable or computer-readable storage medium, such as the computer-readable storage 44, which includes complex programming instructions, such as complex computer-readable program code, configured to cause the central processing unit 120 to carry out the steps described herein. Thus, the computer-readable program code can comprise software instructions for implementing the functionality of the embodiments described herein when executed on the central processing unit 120. The central processing unit 120, in conjunction with the program modules 134 in the volatile memory 128, may serve as a controller for the ACCD 32 that is configured to, or adapted to, implement the functionality described herein. The ACCD 32 also includes the communication interface 40 for communicating with the user device 12 and other computing devices, as appropriate, via the network 20.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   establishing, by a user device, an interactive session with a server device;
   receiving, by the user device from the server device, a first text stream comprising a first contact center prompt, wherein the first contact center prompt is associated with a prompt menu identifier (ID) that identifies an associated predetermined prompt menu, wherein the associated predetermined prompt menu comprises a plurality of contact center actions;
   scrolling a plurality of text components of the first text stream on a display over a first text stream presentation period of time, earlier text components presented earlier in time being replaced on the display with subsequent text components;
   receiving, from a user, a first user input in response to the first text stream and representing a user selection of a response to the first contact center prompt, the response selected by the user being from a plurality of responses comprising at least an accept response and a reject response related to the first contact center prompt, wherein receiving the first user input comprises analyzing an eye of the user while concurrently scrolling the text components on the display and detecting, based on analyzing the eye of the user, the first user input; and
   communicating the first user input to the server device.

2. The method of claim 1, further comprising:
   in response to communicating the first user input, receiving, from the server device, a second text stream comprising a second contact center prompt, wherein the second contact center prompt is associated with the prompt menu ID;
   scrolling a plurality of text components of the second text stream on the display over a second text stream presentation period of time;
   receiving, from the user, a second user input in response to the second text stream and representing a user selection in response to the second contact center prompt, wherein receiving the second user input comprises analyzing the eye of the user while concurrently scrolling the text components on the display and detecting, based on analyzing the eye of the user, the second user input; and
   communicating the second user input to the server device.

3. The method of claim 2, wherein the second user input comprises a text stream control command comprising a previous text stream control command, and further comprising:
   receiving, from the server device, a third text stream that comprises the first contact center prompt; and
   scrolling a plurality of text components of the third text stream on the display over the first text stream presentation period of time.

4. The method of claim 1, further comprising:
   receiving, over a period of time, a plurality of text streams from the server device including the first text stream;
   initiating scrolling of a plurality of text components of one text stream of the plurality of text streams on the display at a first pace;
   receiving, from the user, a user input in response to the one text stream, the user input comprising a text stream control command comprising an increase pace text stream control command; and
   continuing scrolling of the plurality of text components of the one text stream on the display at a second pace that is a greater pace than the first pace.

5. The method of claim 1, further comprising:
   receiving the first user input while concurrently scrolling the text components on the display; and
   communicating the first user input to the server device while concurrently scrolling the text components on the display.

6. The method of claim 1, wherein the first text stream has a display length that exceeds a size of the display.

7. The method of claim 1, wherein the display comprises a size insufficient to present the first text stream at a single instant in time.

8. A user device, comprising:
   a display;
   a communication interface configured to communicate with a network; and
   a controller coupled to the communication interface and configured to:
   establish an interactive session with a server device;
   receive, from the server device, a first text stream comprising a first contact center prompt, wherein the first contact center prompt is associated with a prompt menu identifier (ID) that identifies an associated predetermined prompt menu, wherein the associated predetermined prompt menu comprises a plurality of contact center actions;
   scroll a plurality of text components of the first text stream on the display over a first text stream presentation period of time, earlier text components presented earlier in time being replaced on the display with subsequent text components;
   receive, from a user, a first user input in response to the first text stream and representing a user selection of a response to the first contact center prompt, the response selected by the user being from a plurality of responses comprising at least an accept response and a reject response related to the first contact center prompt, wherein receiving the first user input comprises analyzing an eye of the user while concurrently scrolling the text components on the display and detecting, based on analyzing the eye of the user, the first user input; and
   communicate the first user input to the server device.

9. The user device of claim 8, wherein the controller is further configured to:
   in response to communicating the first user input, receive, from the server device, a second text stream comprising a second contact center prompt, wherein the second contact center prompt is associated with the prompt menu ID;
   scroll a plurality of text components of the second text stream on the display over a second text stream presentation period of time;
   receive, from the user, a second user input in response to the second text stream and representing a user selection in response to the second contact center prompt, wherein receiving the second user input comprises analyzing the eye of the user while concurrently scrolling the text components on the display and detecting, based on analyzing the eye of the user, the second user input; and communicate the second user input to the server device.

10. The user device of claim 9, wherein the second user input comprises a text stream control command comprising a previous text stream control command, and wherein the controller is further configured to:

receive, from the server device, a third text stream that comprises the first contact center prompt; and scroll a plurality of text components of the third text stream on the display over the first text stream presentation period of time.

11. The user device of claim 8, wherein the controller is further configured to:

in response to communicating the first user input, receive, from the server device, a second text stream comprising a second contact center prompt;

initiate scrolling a plurality of text components of the second text stream on the display at a first pace;

receive, from the user, a second user input in response to the second text stream, the second user input comprising a text stream control command comprising an increase pace text stream control command; and continuing scrolling of the plurality of text components of the second text stream on the display at a second pace that is a greater pace than the first pace.

12. The user device of claim 8, wherein the display comprises a size insufficient to present the first text stream at a single instant in time.

* * * * *